(12) United States Patent　　(10) Patent No.: US 8,630,483 B2
Levi et al.　　(45) Date of Patent: Jan. 14, 2014

(54) COMPLEX-OBJECT DETECTION USING A CASCADE OF CLASSIFIERS

(75) Inventors: Dan Levi, Kyriat Ono (IL); Aharon Bar Hillel, Kiryat-Ono (IL)

(73) Assignee: GM Global Technology Operations LLC, Detroit, MI (US)

( * ) Notice: Subject to any disclaimer, the term of this patent is extended or adjusted under 35 U.S.C. 154(b) by 31 days.

(21) Appl. No.: 13/494,676

(22) Filed: Jun. 12, 2012

(65) Prior Publication Data

US 2013/0329988 A1　　Dec. 12, 2013

(51) Int. Cl.
*G06K 9/62*　　(2006.01)
(52) U.S. Cl.
USPC .......................................................... 382/159
(58) Field of Classification Search
USPC .......... 382/103, 118, 159, 190, 209, 218, 224
See application file for complete search history.

(56) References Cited

U.S. PATENT DOCUMENTS

2011/0243461 A1* 10/2011 Nayar et al. .................. 382/224
2012/0169860 A1* 7/2012 Lian et al. ...................... 348/77

OTHER PUBLICATIONS

Viola, et al. "Rapid Object Detection using a Boosted Cascade of Simple Features", 2001, pp. 1-9.*

* cited by examiner

*Primary Examiner* — Daniel Mariam

(57) ABSTRACT

Complex-object detection using a cascade of classifiers for identifying complex-objects parts in an image in which successive classifiers process pixel patches on condition that respective discriminatory features sets of previous classifiers have been identified and selecting additional pixel patches from a query image by applying known positional relationships between an identified complex-object part and another part to be identified.

20 Claims, 14 Drawing Sheets

COMPLEX-OBJECT DETECTION USING A CASCADE OF CLASSIFIERS

BACKGROUND OF THE PRESENT INVENTION

Computer-based object detection systems and methods are used in many different applications requiring high accuracy achieved in near real-time. Examples of such applications include active vehicular safety systems, smart surveillance systems, and robotics.

In the area of vehicular safety, for example, accurate high-speed identification of pedestrians or objects in the path of travel enables an automated safety system to take necessary measures to avoid collision or enables the automated system to alert the driver allowing the driver to take necessary precautions to avoid collision.

BRIEF DESCRIPTION OF THE DRAWINGS

The subject matter regarded as the invention is particularly pointed out and distinctly claimed in the concluding portion of the specification. The invention, however, in regards to the its components, features, method of operation, and advantages may best be understood by reference to the following detailed description and accompanying drawings in which:

Figure 1:
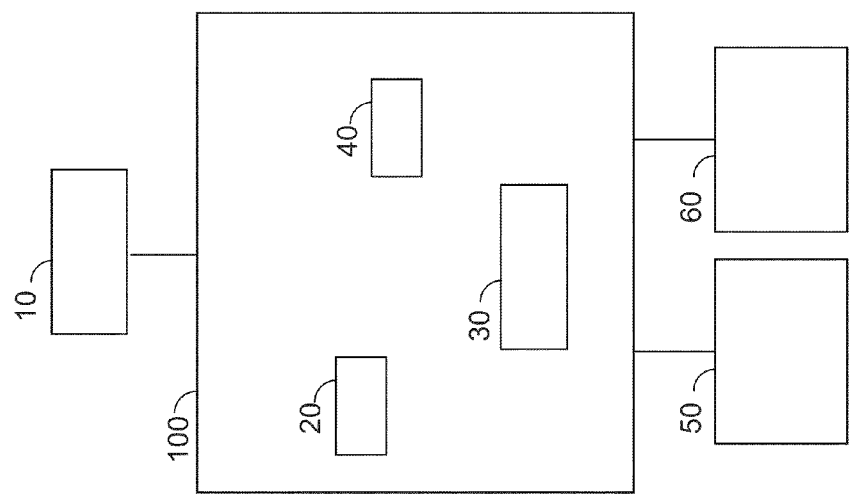
FIG. 1 is a schematic, block diagram of a system for complex-object detection using a cascade of classifiers, according to an embodiment of the present invention.

It will be appreciated that for simplicity and clarity of illustration, elements shown in the figures have not necessarily been drawn to scale and reference numerals may be repeated in different figures to indicate same, corresponding or analogous elements.

DETAILED DESCRIPTION OF THE PRESENT INVENTION

In the following detailed description, numerous details are set forth in order to provide a thorough understanding of the invention. However, it will be understood by those skilled in the art that the present invention may be practiced without these specific details. Furthermore, well-known methods, procedures, and components have not been described in detail so as not to obscure the present invention.

It should be appreciated that the following terms will be used throughout this document.

"Complex-object" refers to an object which is present in an image and requires a plurality of templates to be described or identified because of various complexities associated with the object. These complexities may include object parts having a variant anthropometric relationship with each other, large size variations within a particular classification, partial obstruction, and multiple views. Typical examples include inter-alia people, animals, or vehicles. For the purposes of this document, and without derogating generality, a person will be highlighted as an example of a complex-object.

"Classifier" refers to a function (e.g. a computer executable function) configured to identify image object parts based on discriminative features characteristic of parts associated with complex-objects. The discriminative features may typically be processed to produce, for example, an output value which is compared to a threshold value derived analogously from a model image to determine a "match". Such matching may be based, for example, on imaging parameters like pixel intensities, geometrical primitives, and/or other image parameters.

"Cascade of classifiers" refers to a plurality of successive classifiers.

"Pixel patch" refers to a region of pixels.

"Discriminative features" refers to parameters of such image pixels as, for example, intensities gradients, average intensities, pixel colors and are representative of a feature of the image content.

"Anthropometric relationship" refers to the relative size, placement and orientation of body parts in human beings as projected in the image.

"Collaborative search" refers to selecting pixel patches in a query image based on prior, successful identification or classification of at least one complex-object part.

According to embodiments of the present invention a method for complex-object detection using a cascade of classifiers may involve identifying a pixel patch in a query image and processing it using a cascade of classifiers in search of learned discriminatory features. As noted above, the cascade of classifiers may have a succession of classifiers in which each classifier may be configured to identify its respective discriminatory feature set. Each successive classifier in the cascade searches for a greater number of discriminatory features for the same object part and is configured to identify its respective discriminative feature set only after previously employed classifier have successfully identified their respective discriminatory features. If this has not been achieved, each successive stage-classifier does not process the pixel patch and that particular patch is rejected and designated as an area lacking the required discriminative features. Another pixel patch may be then selected from the query image on a random or semi-random basis. In other embodiments an adjacent patch or any other patch may be selected as the next patch to process when prior classifiers do identify their respective discriminatory feature sets, successive classifiers process the pixel set until an object part is identified. After found, the object part location together with learned spatial relationships between object parts of a model object image serves as the basis for propagating additional, pixel patches within the query image likely to contain additional object parts. Other embodiments employ a data map in which the maximum of an argument of a probability function is used to select an additional pixel set having the greatest probability of containing an object part.

The collective computational savings afforded by the reduced number of classification operations for each part and the reduced number of search locations, according to embodiments of the present invention, enable near real-time, highly accurate identification of complex objects. Accordingly, the method and system according to the present invention have application in a wide variety of real world applications requiring accurate and quick complex-object identification like active vehicular safety features, smart surveillance systems, and robotics.

Turning now to the figures, FIG. 1 is a schematic diagram of a system for complex-object detection using a cascade of classifiers according to an embodiment of the present invention. Complex object detection system 100 may include one or more computer vision sensors 10 (e.g., cameras, video camera, digital camera, or other image collection devices). Computer vision sensor 10 may capture an image that may include one or more objects and/or features. Images may also be otherwise input into system 100, for example, as downloads from other computers, databases or systems. Object detection system 100 may include one or more processors or controllers 20, memory 30, long term non-transitory storage 40, input devices 50, and output devices 60. Non-limiting examples of input devices 50 may be, for example, a touch screen, a capacitive input device, a keyboard, microphone, pointer device, a button, a switch, or other device. Non-limiting examples of output devices include a display screen, audio device such as speaker or headphones. Input devices 50 and output devices 60 may be combined into a single device.

Processor or controller 20 may be, for example, a central processing unit (CPU), a chip or any suitable computing device. Processor or controller 20 may include multiple processors, and may include general purpose processors and/or dedicated processors such as graphics processing chips. Processor 20 may execute code or instructions, for example stored in memory 30 or long term storage 40, to carry out embodiments of the present invention.

Memory 30 may be Random Access Memory (RAM), a read only memory (ROM), a Dynamic RAM (DRAM), a Synchronous DRAM (SD-RAM), a double data rate (DDR) memory chip, a flash memory, a volatile memory, a non-volatile memory, a cache memory, a buffer, a short term memory unit, a long term memory unit, or other suitable memory units or storage units. Memory 30 may be or may include multiple memory units.

Long term, non-transitory storage 40 may be or may include, for example, a hard disk drive, a floppy disk drive, a Compact Disk (CD) drive, a CD-Recordable (CD-R) drive, a universal serial bus (USB) device or other suitable removable and/or fixed storage unit, and may include multiple or a combination of such units. It should be appreciated that image data, code and other relevant data structures are stored in the above noted memory and/or storage devices.

Figure 2:
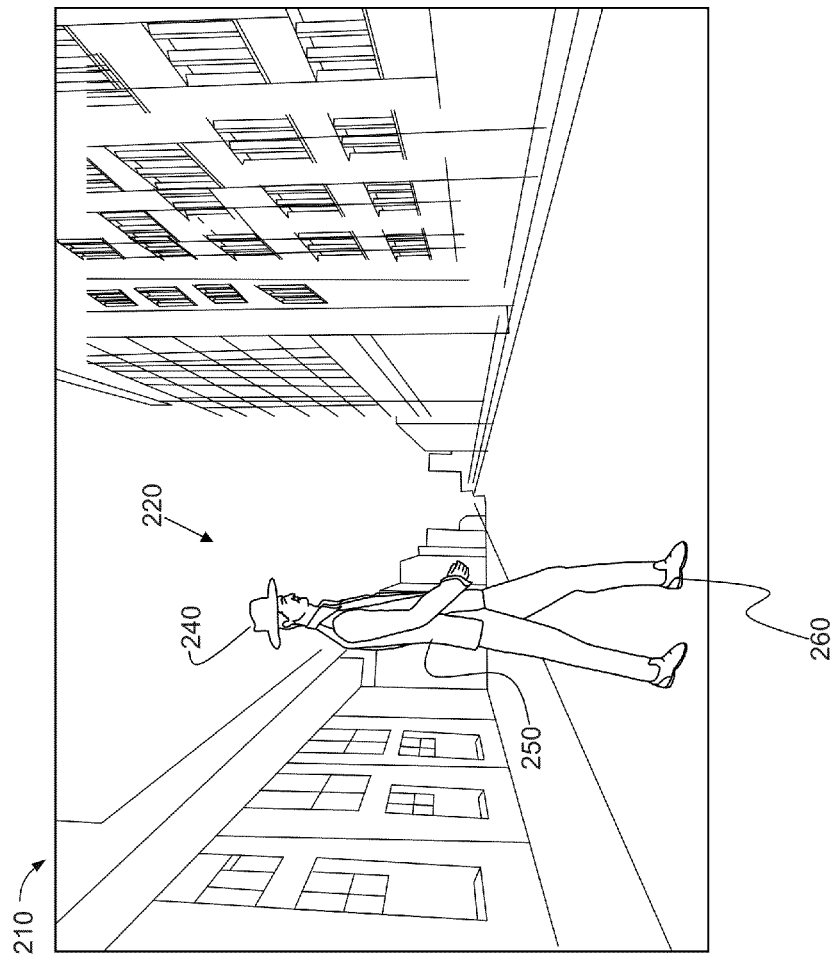
FIG. 2 is a query image having a complex-object to be identified.

FIG. 2 is a query image 210 containing a complex object 220 of a person to be classified by indentifying various parts; head 240, back 250, and foot 260. It should be appreciated that for the purpose of this document a person will be used as a non-limiting example of a complex-object.

Figure 3:
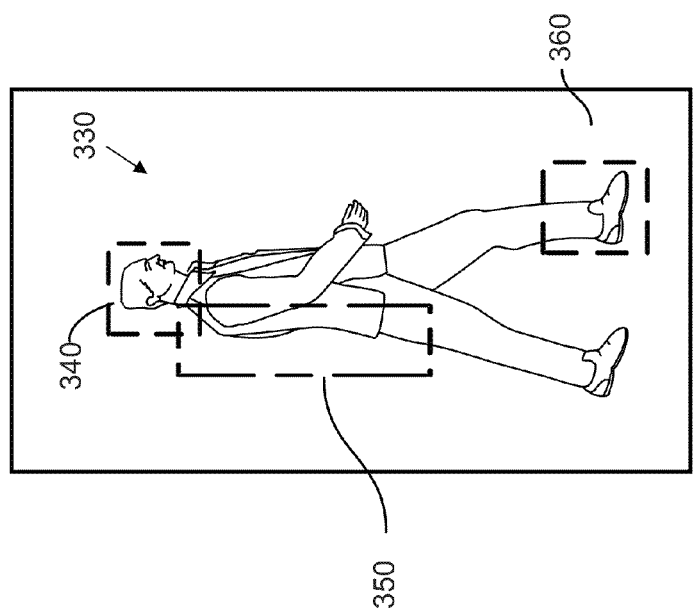
FIG. 3 is sample complex-object whose parts have been designated for learning for use by classifiers of a cascade of classifiers.

FIG. 3 depicts an image of complex-object model 330 from which discriminative feature sets for each part and anthropometric relationships between the parts may be extracted. Model complex object 330 is divided into pixel patches or image areas containing object parts. In the non-limiting example of FIG. 3 the complex object is person 330 in which three independent parts have been identified; a head 340, a back 350, and a foot 360. It should be appreciated that a wide variety of complex-objects are suitable models that can be used to learn stage-classifiers. Such models include living and inanimate objects, objects having a large number of parts, objects having parts whose geometrical relationship to each other is variant, objects partially obstructed, all objects viewed from various angles or distances as noted above.

Figure 4:
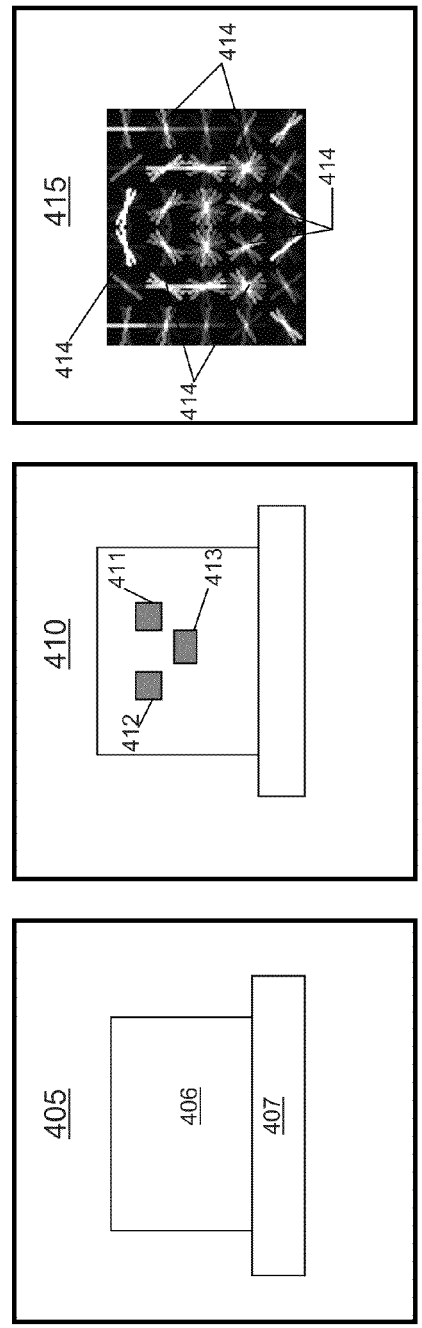
FIG. 4 is a graphical representation of features from which discriminative features are derived for use by each of three classifiers of a cascade of classifiers when identifying features associated with a part of a complex-object according to an embodiment of the present invention.

FIG. 4 depicts three graphical representations, 405, 410, and 415, of features derived from a front view of image sample (not shown). These features are used in learning successive classifiers of a cascade according to embodiments of the present invention. A feature selection algorithm may be applied to image sample to obtain graphical representations 405, 410, and 415 that may be further processed to identify discriminative features most characteristic of features associated with a sample. For example, the feature selection algorithm may generate ideal discriminative features based on only two pixel areas 406 and 407 for use with a first classifier, ideal discriminative features based also on pixel areas 411-413 for use with a second classifier, and seven additional pixel areas collectively designated 414 for use with a third classifier. In this manner, each classifier of a three-classifier cascade is enabled to identify distinguishing features of an object part associated with the complex-object with increasing accuracy and clarity.

It should be noted that there are many pixel or image parameters that may be used for extracting most effective feature identifying discriminative features and a few examples include Histogram of Gradients (HoGs), integral channel features and Haar features. Furthermore, it should be appreciated that in the example of FIG. 4 frontal facial features are identified from a sample image; however, features may be extracted from side views of sample images in accordance with the particular view of the object part to be identified.

Figure 5:
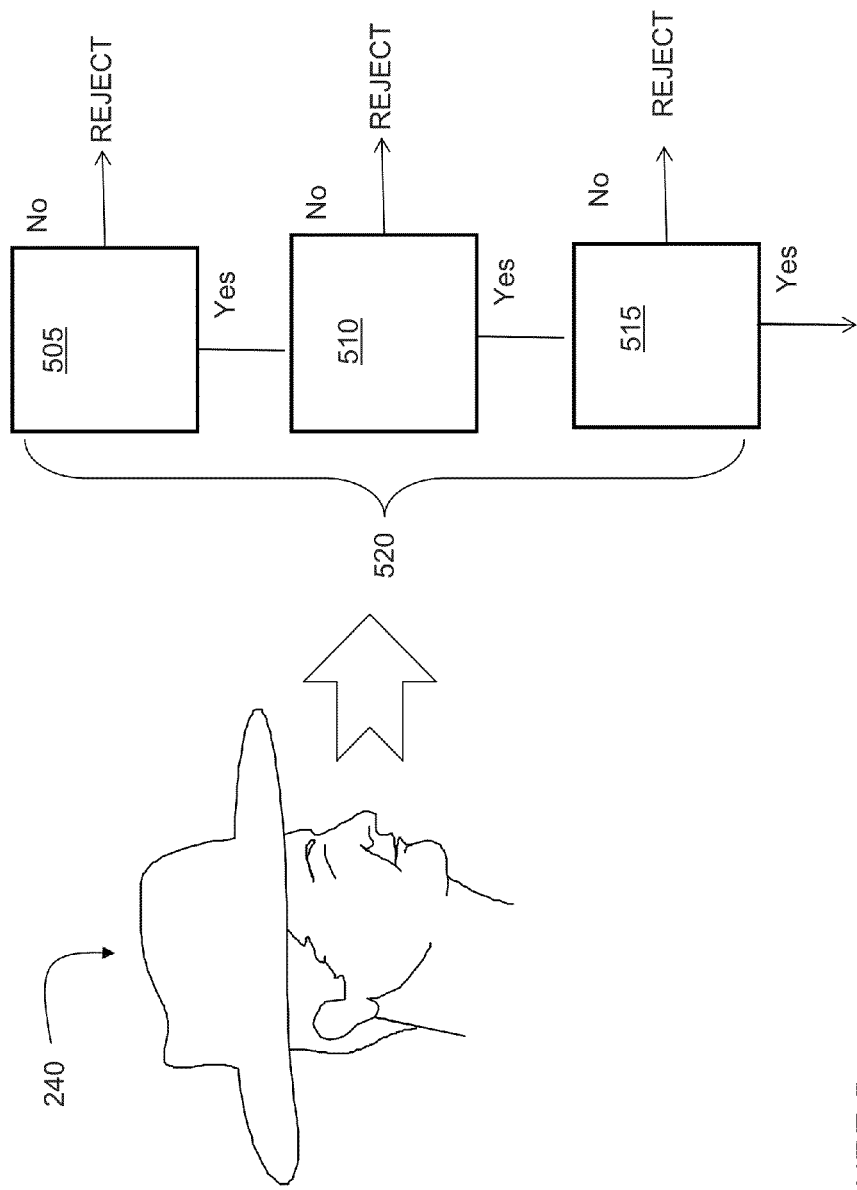
FIG. 5 depicts a three-classifier cascade of classifiers in which each classifier identifies its respective set of learned discriminative features characteristic of a distinguishing feature of part associated with complex-object depicted in FIG. 2 according to an embodiment of the present invention.

FIG. 5 depicts a three-classifier cascade configured to use the learned discriminative features on a stage-by-stage basis to identify complex-object part 240 according to embodiments of the present invention.

As noted above, each successive classifier searches object part 240 to identify its respective set of discriminative features. In the present, non-limiting example, first stage-classifier 505 checks candidate object part 240 for discriminative features derived from graphic representation 405. If they are not found, the identified pixel patch is rejected and system 100 either propagates additional search areas in query image 210 or applies first stage-classifier 505 to additional pixel patches of complex-object parts in queue. If first classifier 505 identifies this first set of discriminative features, second classifier 510 searches for a second set of discriminative features derived from graphic representation 410. If classifier 510 does not identify them, this pixel patch object is also rejected as noted above. If a match is achieved, third classifier 515 is applied and attempts to identify the discriminative features derived form graphic representation 415. If a match is not identified, the searched pixel patch part is rejected, whereas, if a match is identified the object part 240 is deemed to have been identified by the cascade of classifiers 520. It should be noted that any cascade of classifiers including any number of classifiers employing any numbers of discriminative features may be considered in embodiments of the present invention.

It should be noted that upon rejection, the pixel patch found to be devoid of the discriminative features is designated as a non-viable area in regards to this particular object part to avoid unnecessary searches in the same area for the part for which it was rejected. It should be noted that the present invention includes embodiments in which pixel patches are rejected in reference to a particular part and may indeed be searched for additional object parts.

Figure 6:
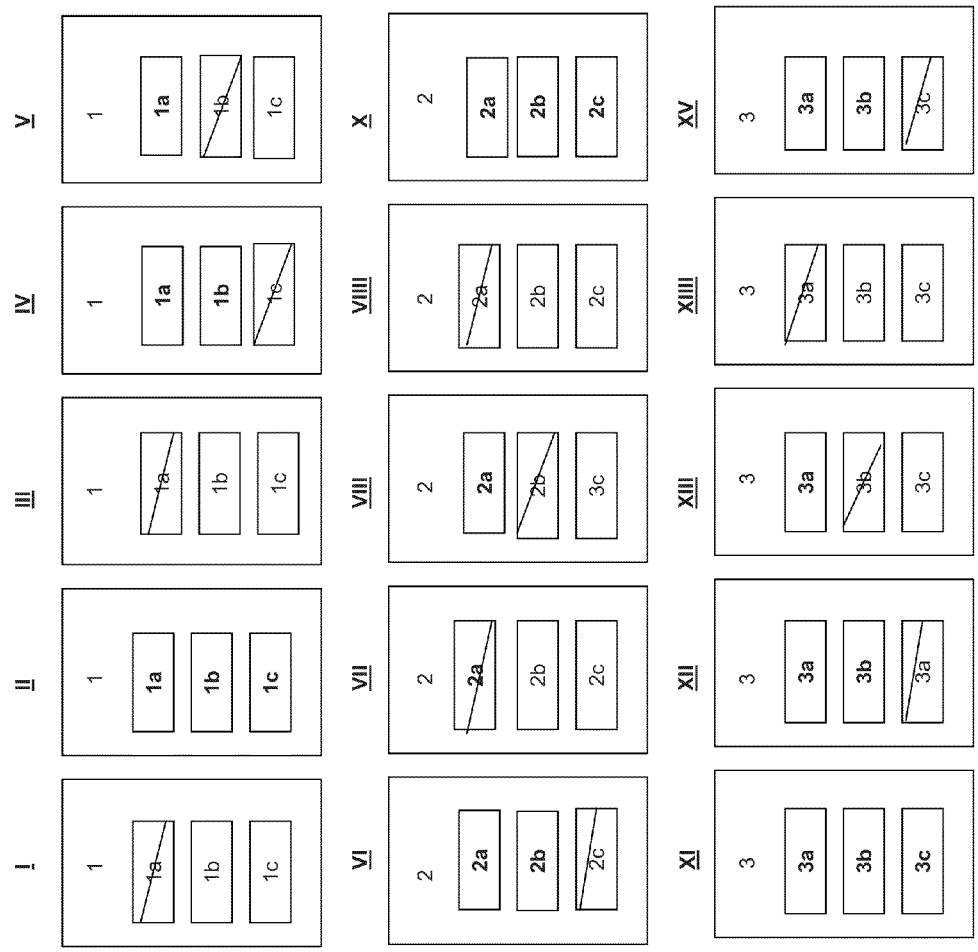
FIG. 6 depicts a processing configuration of the cascade of classifiers of FIG. 5 for three object parts from multiple locations in which each successive classifier processes a pixel patch on condition that prior classifiers successfully identified their respective discriminative features according to an embodiment of the present invention.

FIG. 6 depicts an example of classifier processing of pixel patches at five different locations I-V in which five separate cascades of three classifiers 1-3 each are employed to identify three complex-object parts 1-3 according to embodiments of the present invention. As depicted, classifiers 1a determine that content from locations I and III lack the desired features and so there is no further processing of remaining classifiers 1b and 1c of content from these locations. Classifiers 2b continue processing content from remaining locations II, IV and V. Classifier 2b determines that content from location V also lacks the desired features and so classifiers 1c continue processing content from locations II and IV only. Classifier 1c determines that content from location IV also lacks the desired features and classifier 1 processing content from location II identifies the desired features and so part 1 is deemed to have been located at location II.

The search for complex-object part 2 may be continued at several (e.g. five) different locations in which respective pixel patches from locations VI-X are processed by another cascade of three classifiers 2a-2c. Content from locations VII and VIII is rejected by classifier 2a and so processing continues by classifiers 2b of content from remaining locations VI, VIII and X. Classifiers 2b reject content from location VIII and so processing continues by classifiers 2c of content derived from locations VI and X. Classifier 2c rejects content derived from location VI while classifier 2a identifies the relevant features in the content derived from location X. Since all three classifiers 2a-2c identified the relevant features in the content derived form location X, part 2 is deemed to have been identified.

The search for part three continues with five cascades of three classifiers each 3a-3c of content derived from locations VI-X. Classifier 3a rejects content derived from location XIIII so processing continues of pixel patches derived from remaining locations XI-XII and XV. Classifier 3b rejects content derived from location XIII and classifiers 3c continue processing content derived from remaining locations XI-XII and XV and then reject content derived form locations XII and XV. Remaining classifier 3c identifies the relevant features in content derived from location XI. Again, since all three classifiers 3a-3c have identified the relevant features in the content derived from this location, part 3 is deemed identified at location XI.

Figure 7:
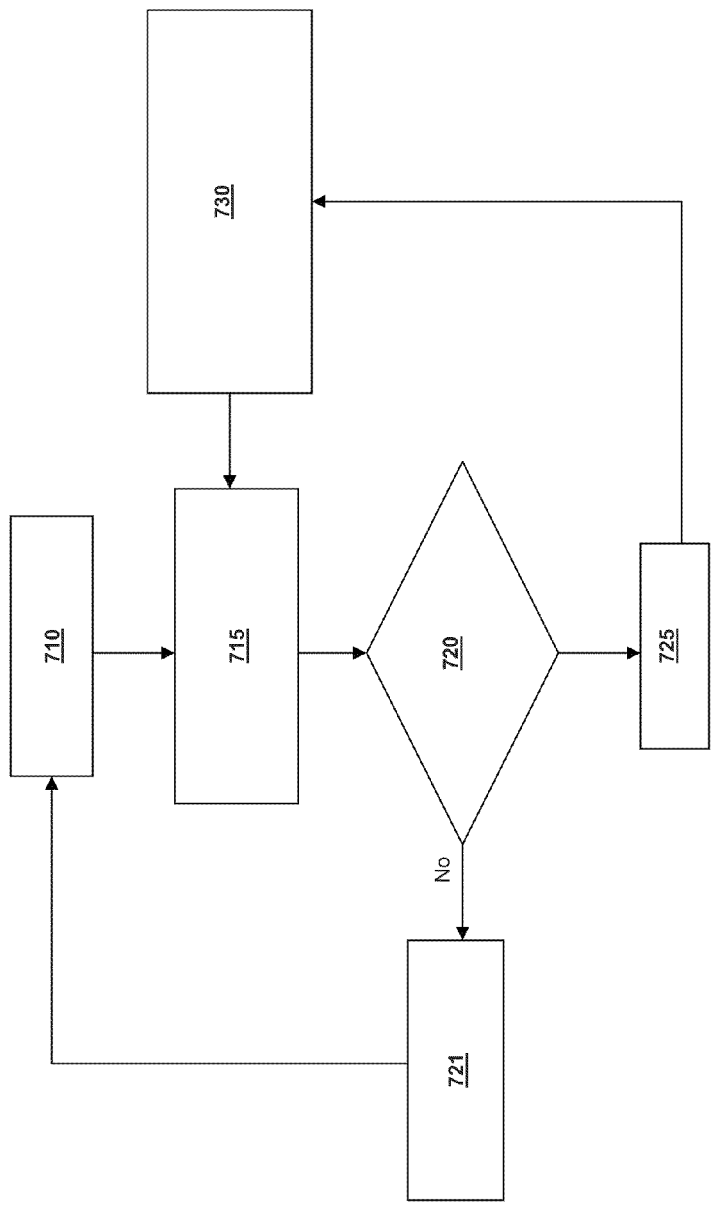
FIG. 7 is a flow chart illustrating the method of identifying additional pixel patches likely containing additional complex-object parts based on learned positional relationships with respect to an identified part according to an embodiment of the present invention.

FIG. 7 and is a flow charts depicting the method described above with the additional steps of propagating additional search areas or pixel patches for remaining object parts after classification of an object part.

Specifically, in step 710 according to an embodiment of the present invention, a first pixel patch may be selected from query image 210, e.g. on a random basis according to embodiments of the invention.

In step 715, successive classifiers may be applied to each part on condition that all previous classifiers of the cascade have identified their respective discriminatory feature sets. In step 720, if all respective discriminatory feature sets of all the classifiers have been identified, an object part is deemed to have been classified or identified as noted above. If, however, not all respective discriminatory feature sets have been identified, that pixel patch is designated as "Rejected" in step 721 and a new pixel patch is selected from the query image 210 on a random or semi-random basis in step 710. Again, successive classifiers process the newly selected pixel patch as shown in step 715. When all classifiers have successfully identified their respective discriminatory features, then an object part has been classified as shown in step 725 and an additional pixel patch is selected from query image based on learned spatial relationships between the previously identified object part (if there is one) and the part to be indentified as depicted in step 730. After a new pixel patch likely containing the additional object part is selected, the process is repeated by applying successive classifiers associated with the additional part as shown in step 715.

Figure 8:
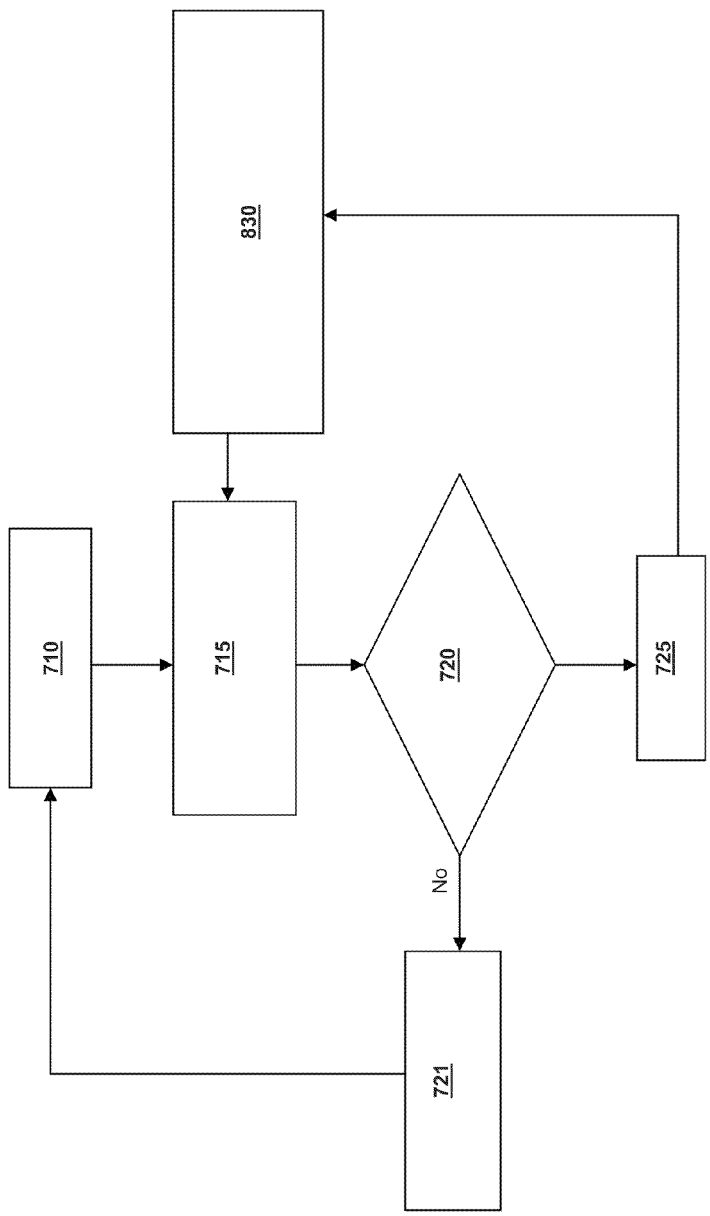
FIG. 8 is a flow chart illustrating the method of identifying additional pixel patches likely containing additional complex-object parts based on calculated probability with respect to an identified part according to an embodiment of the present invention.

The method depicted in FIG. 8 is analogous to the method illustrated in FIG. 7 with an alternative manner of selecting additional pixel patches likely containing additional object parts in which a probability map is employed as shown in step 830.

Specifically, a probability value ranging between zero and one is assigned to every pixel in response to output values of each classifier processing a particular pixel patch. After an object part is identified, the probability map is updated accordingly and a pixel patch selected is by calculating the argument of the maximum (Argmax) of a probability function for the next object part, or equivalently:

$$\text{Argmax} P_{n+1} \text{Prob}(P_{n+1}|P'_{n+1}, P_1, \ldots, P_n) \text{ wherein:}$$

$P_n$ is the probability map of detecting part n=1 ... N;
$P_{n+1}$ is the previous probability map.

Regions having probability values less than a pre-defined value are rejected by setting the probability values to zero.

Figure 9:
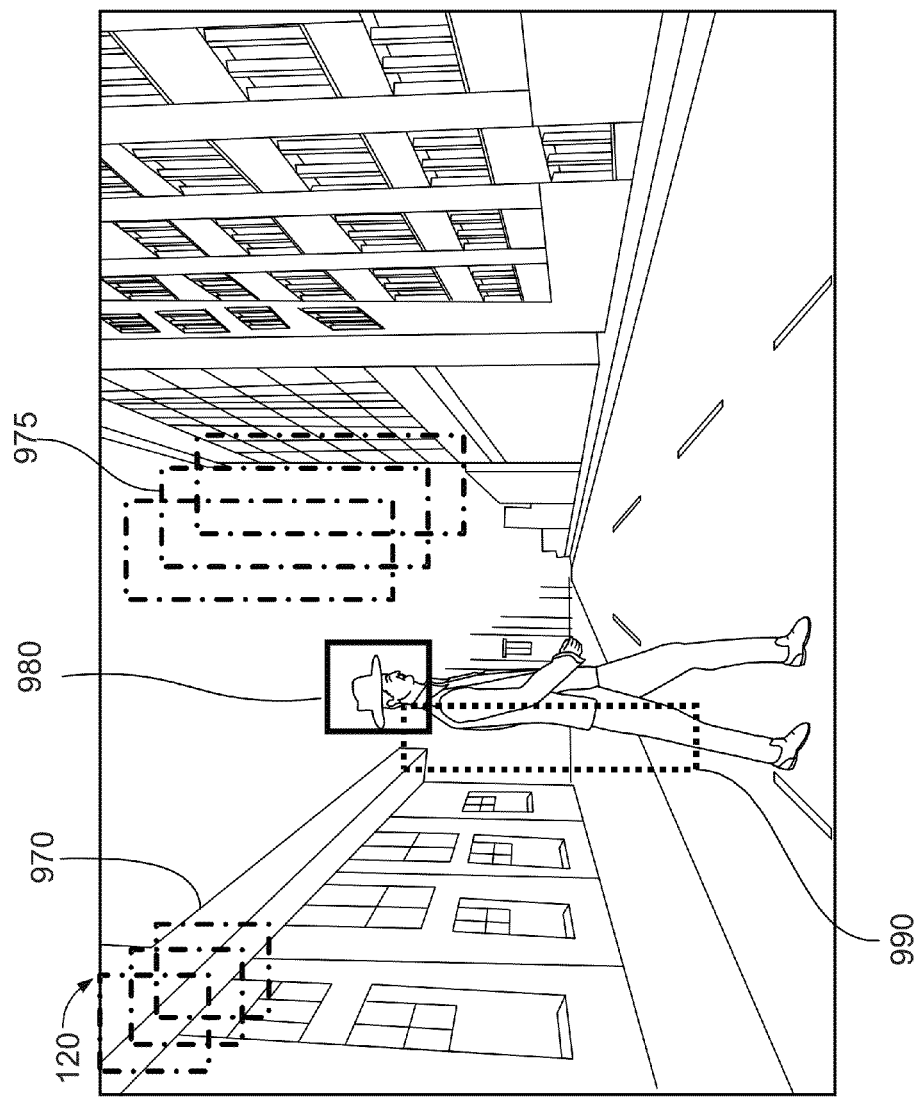
FIG. 9 depicts the query image of FIG. 2 in which multiple search windows enclosing pixel patches have been propagated at various locations prior to successful identification of an complex-object part and a first preferred location following successful identification of the part according to an embodiment of the present invention.
Figure 10:
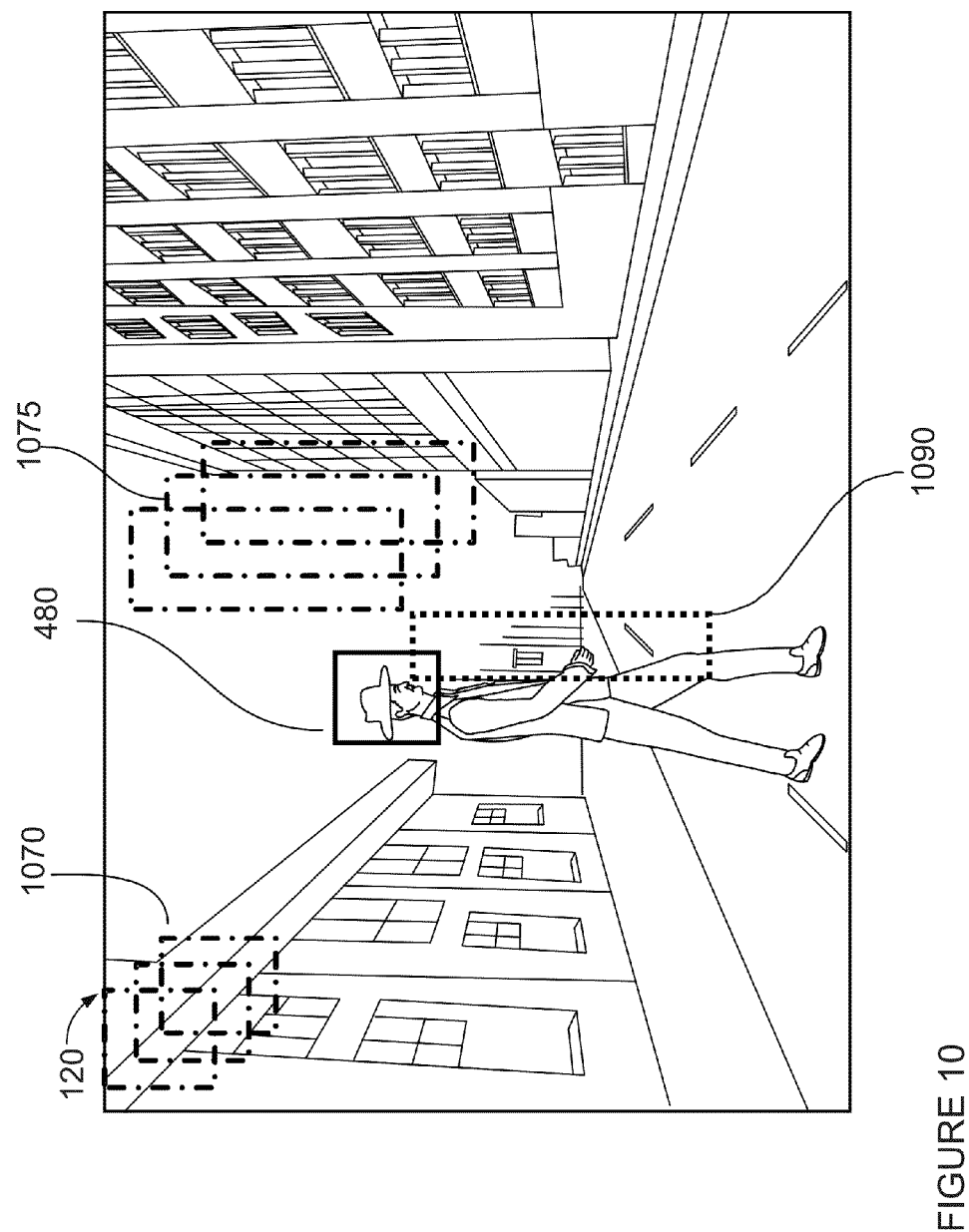
FIG. 10 depicts the query image of FIG. 9 in which multiple search windows enclosing pixel patches have been propagated at various locations prior to successful identification of a part and a second preferred location following successful identification of a part according to an embodiment of the present invention.

FIG. 9 and FIG. 10 are query images 210 of FIG. 2 with superimposed search windows indicating areas being searched for an object part. In various embodiments, system for complex-object detection using a cascade of classifiers, according to an embodiment of the present invention may be configured to propagate search windows enclosing an area substantially corresponding to the area of the learned object part. By way of a non-limiting example, search windows 970 and 975 enclose areas corresponding to areas containing a learned head 340 and a learned back 350, respectively, of FIG. 3. Furthermore, search windows 970 and 975 may be propagated in a plurality of locations in which a portion of the new search area overlaps a portion of the previous searched area as shown or in a method which is entirely random for either the first pixel patch selected or two replace patches rejected as lacking the relevant discriminative features.

When an object part is identified, it is used as a basis for propagating additional search areas most likely containing the requested object part as noted above. Some embodiments apply a learned anthropometric relationship to the identified part to direct the ensuing search area to pixel areas most likely containing the additional part as noted above. Other embodiments use the location of the identified part as a priori data when determining the "maxarg" of a probability function for all parts as noted above. Window 980 indicates that head 240 (FIG. 2) has been located and therefore search windows 990 and 1090 (FIG. 10) are propagated in areas most likely to contain back 250 because these areas represent the anthropometric relationship of these parts in model image 330 of FIG. 3. Since both sides of the object 220 fulfill leaned anthropometric relationship, both search windows 990 and 1090 areas are identified as appropriate pixel patches to be searched.

In some embodiments of the present invention, when employing probability maps, both areas enclosed in windows 990 and 1090 may be determined to have a high probability of containing back. 250 in view of the updated probability data. It should be appreciated that any plurality of searches are included within the scope of the present invention.

Figure 11:
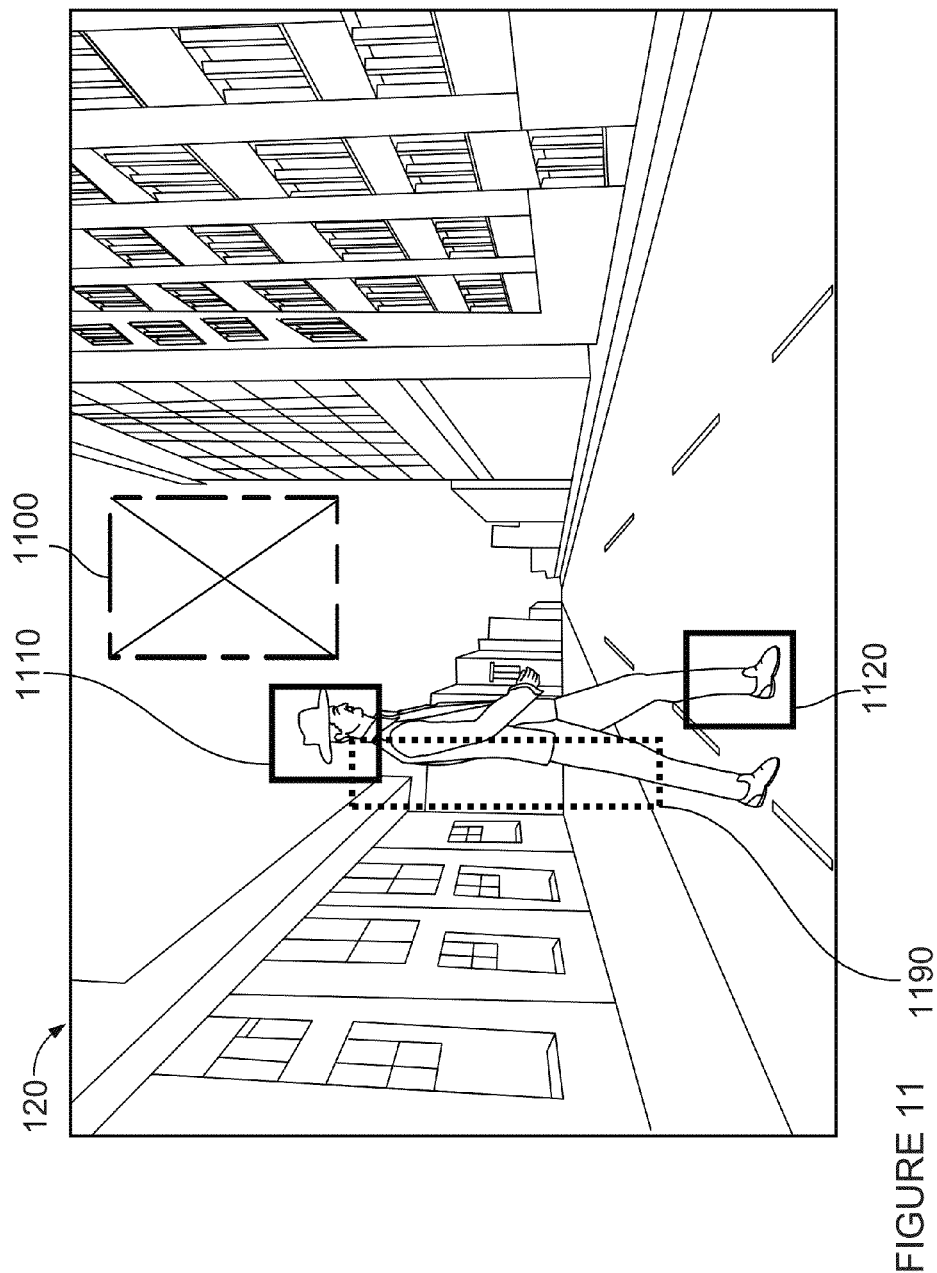
FIG. 11 depicts the query image of FIG. 2 in which a search windows enclosing a pixel patch rejected from future attempts to identify relevant features and a search window propagated in search of complex-object parts at a preferred location based on successful identification of two object parts according to an embodiment of the present invention.

FIG. 11 illustrates an embodiment in which pixel patches are propagated on the basis of successful identification or classification of a plurality of object parts. For example, both head 240 and foot 260 (FIG. 3) have been identified in search windows 1110 and 1120, respectively. Search window 1190 is propagated on the basis of learned anthropometric relationships between each of these parts from the model image 330 depicted in FIG. 3 or updated probability data. It should be appreciated that embodiments in which additional search areas are propagated on the basis of any number of previously identified object parts are included within the scope of the present invention.

In some embodiments of the present invention computational is efficiency further optimized by reducing search redundancy. Window 1100 is a window designating a rejected pixel patch or area after any one of the classifiers of a cascade has determined that the patch is devoid of discriminative features.

Figure 12:
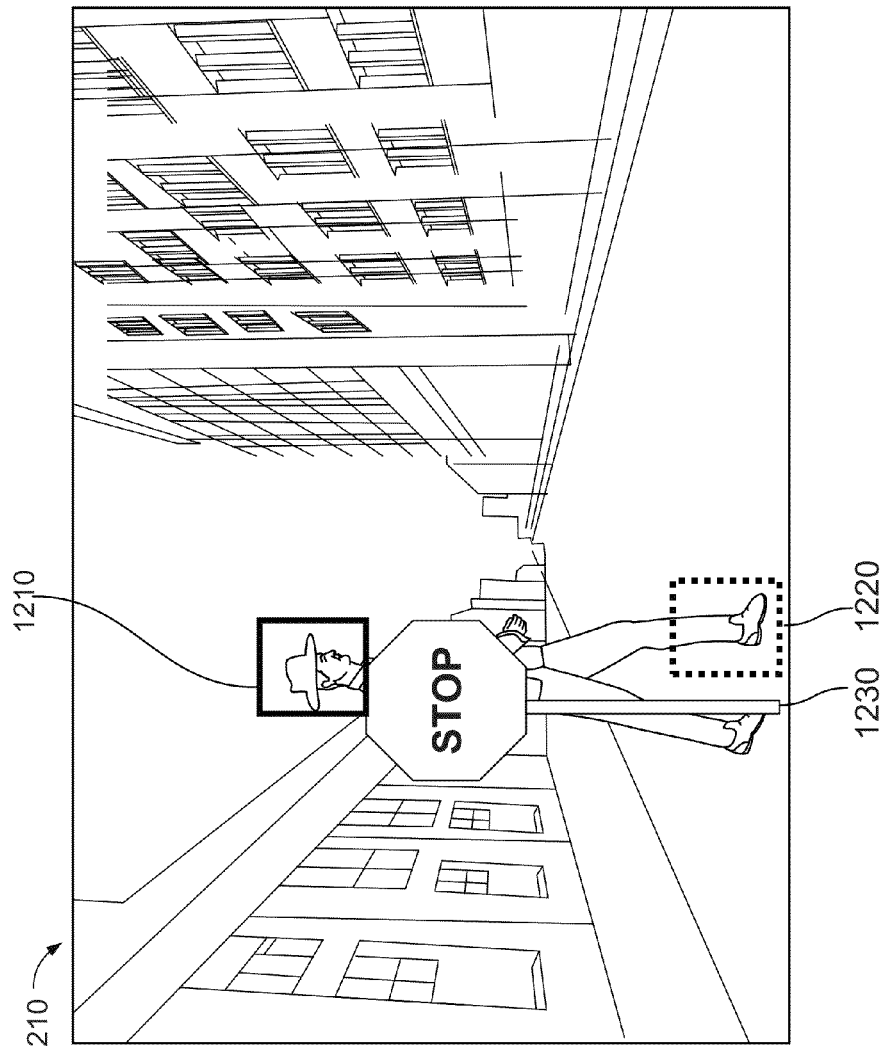
FIG. 12 depicts the query image of FIG. 2 having a complex-object partially obstructed in which search windows enclosing pixel patches likely containing another object part based on a previously identified part according to an embodiment of the present invention.
Figure 13:
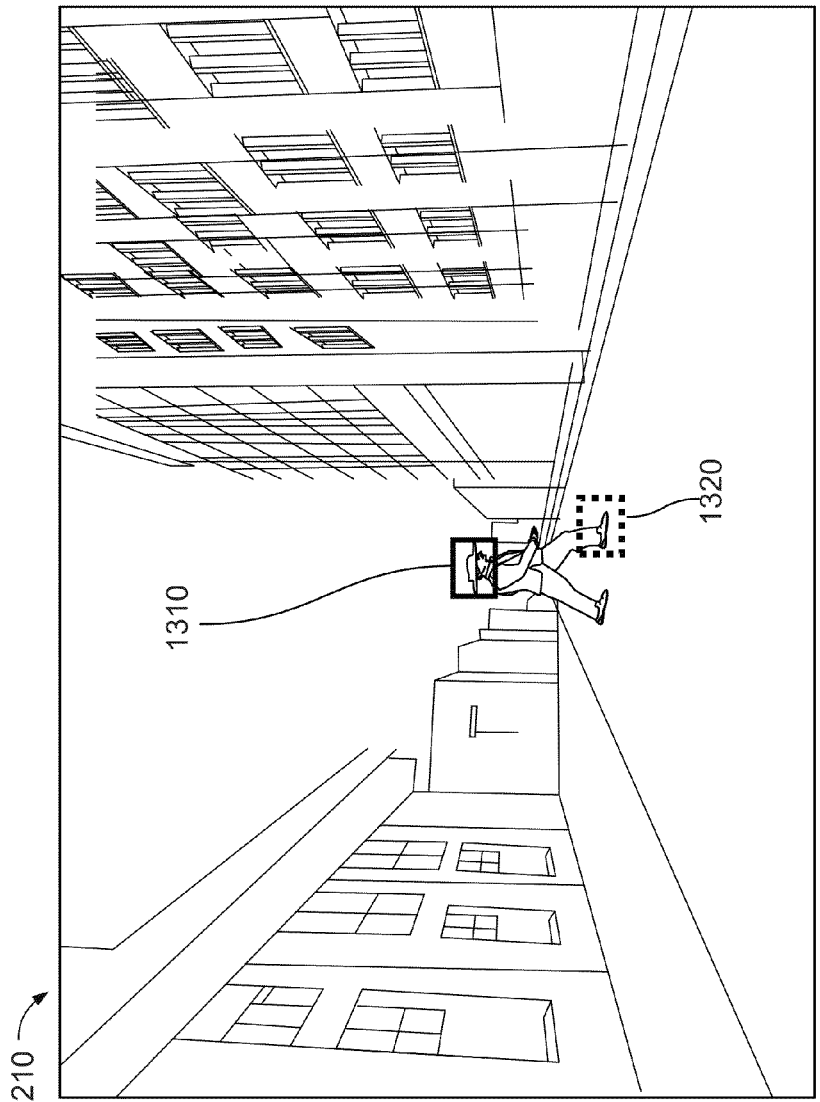
FIG. 13 depicts the query image of FIG. 2 having a complex-object in reduced scale in which search windows enclosing pixel patches likely containing another object part based on a previously identified part according to an embodiment of the present invention.

FIG. 12 and FIG. 13 illustrate applications of the above described, cascade-classifier assisted search for complex-object partially obstructed or reduced-in-scale, respectively according to embodiments of the present invention. Specifically, head 240 is identified within window 1210 and window 1220 is propagated as a possible location for foot 260 based on either learned anthropometric relationship between the head 340 and feet 360 of FIG. 3 or based on probability data in view of identified head 240, as noted above.

Figure 14:
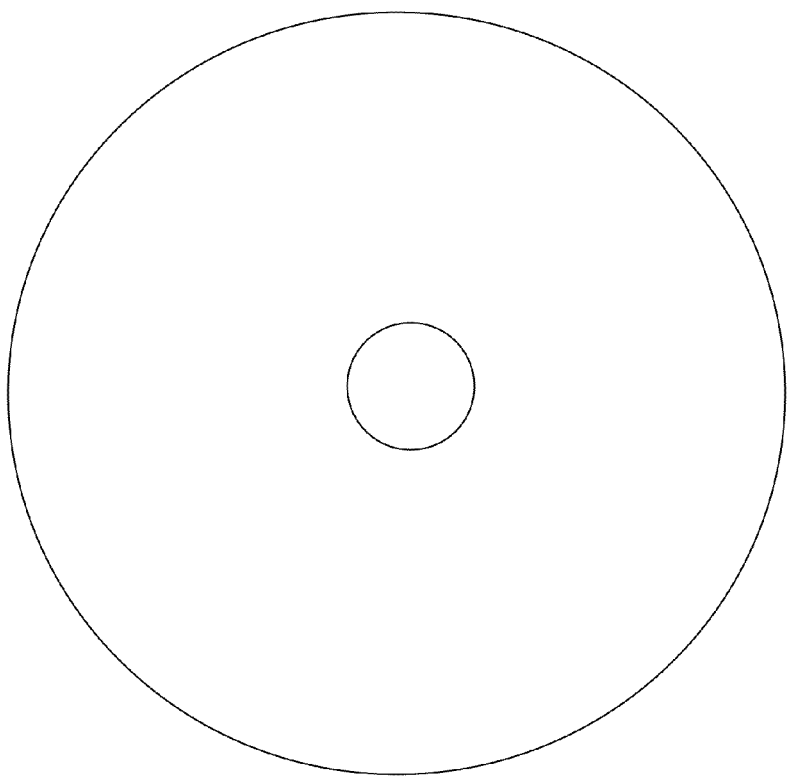
FIG. 14 depicts a non-transitory computer-readable medium having stored thereon instructions for identifying a complex-object using a cascade of classifiers in a query image according to an embodiment of the present invention.

FIG. 14 depicts a non-limiting, computer-readable media containing executable code for configuring a computer system to execute the above described, cascade-classifier assisted search for complex-objects within an image according to embodiments of the present invention.

Embodiments of the present invention identify a complete-object by combining object parts indentified in various pixel patches.

It should be appreciated that search areas may be propagated on the basis of any number of successfully identified object parts in accordance to the particular embodiment. It should be further appreciated that search like circular, triangular, and polygonal shaped search widows are within the scope of the present invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for identifying a complex-object in a query image, the method comprising:
    performing computer-enabled steps of:
        processing at least one pixel patch from the query image with a cascade of classifiers, each classifier of the cascade configured to identify at least one discriminative feature characteristic of a part of the complex-object, wherein each successive classifier of the cascade identifies a number of discriminative features greater than a number of discriminative features identified by prior classifiers of the cascade; and
        selecting an additional pixel patch from the query image for processing after a last classifier of the cascade has identified the distinguishing feature, wherein the selecting is based on a known positional relationship between the part and an additional part of the complex-object.

2. The method of claim 1, wherein the known positional relationship is learned from a sample image.

3. The method of claim 1, wherein the known positional relationship is an anthropometric relationship.

4. The method of claim 1, further comprising selecting a second additional pixel patch from the query image for processing after a last classifier of the cascade has identified a distinguishing feature of a second part, wherein the selecting is based on a known positional relationship between the part, the second part and a third additional part of the complex object.

5. The method of claim 1, further comprising identifying at least one discriminative feature of a part of a sample complex-image, the discriminative features characteristic of the part of the complex-object.

6. The method of claim 1, further comprising selecting an additional pixel patch on a random basis.

7. The method of claim 1, further comprising designating a searched pixel patch to be disregarded when selecting future pixel patches, the searched pixel patch determined to be devoid of the discriminative features characterizing a part of the complex-object.

8. A system for identifying a complex-object in a query image, the system comprising:
    a processor configured to:
        process at least one pixel patch from the query image with a cascade of classifiers, each of the classifiers of the cascade configured to identify at least one discriminative feature characteristic of a part of the complex-object, wherein each successive classifier of the cascade uses a number of discriminative features greater than a number of the discriminative features used in prior classifiers of the cascade; and select an additional pixel patch from the query image for processing after a last classifier of the cascade has identified the distinguishing feature, wherein the selecting is based on a known positional relationship between the part and an additional part of the complex-object.

9. The system of claim 8, wherein the known positional relationship is learned from a sample image.

10. The system of claim 8, wherein the known positional relationship is an anthropometric relationship.

11. The system of claim 8, wherein the processor is further configured to select a second additional pixel patch from the query image for processing after a last classifier of the cascade has identified a second part, wherein the second additional pixel patch is selected based on a known positional relationship between the part, the second part and a third additional part of the complex object.

12. The system of claim 8, wherein the processor is further configured to identify discriminative features of a part of a sample complex-image, the discriminative feature characteristic of the part of the complex-object.

13. The system of claim 8, wherein the processor is further configured to select an additional pixel patch based on a random basis.

14. The system of claim 8, wherein the processor is further configured to designate a searched pixel patch to be disregarded when selecting future pixel patches, the searched pixel patch found to be to be devoid of the discriminative features characterizing a feature of a part of the complex-object.

15. A non-transitory computer-readable medium having stored thereon instructions for identifying a complex-object in a query image, which when executed by a processor cause the processor to perform the instructions comprising of:

processing at least one pixel patch from the query image with a cascade of classifiers, each successive classifier of the cascade configured to identify at least one discriminative feature in the pixel patch that characterizes a part of the complex-object; wherein each successive classifier of the cascade uses a number of discriminative features greater than a number of the discriminative features used in prior classifiers of the cascade; and selecting an additional pixel patch from the query image for processing after a last classifier of the cascade has identified the distinguishing feature, wherein the selecting is based on a known positional relationship between the part and an additional part of the complex-object.

16. The non-transitory, computer-readable storage medium of claim 15, wherein the known positional relationship is learned from a sample image.

17. The non-transitory, computer-readable storage medium of claim 15, wherein the program code is further configured to combine parts of the complex-object identified in the query image so as to indentify a complete-complex-object.

18. The non-transitory, computer-readable storage medium of claim 15, wherein the program code is further configured to cause the processor to select a second additional pixel patch from the query image for processing after a last classifier of the cascade has identified a distinguishing feature of a second part, wherein the second additional pixel patch is selected based on a known positional relationship between the part, the second part and a third additional part of the complex object.

19. The non-transitory, computer-readable storage medium of claim 15, wherein the program code is further configured to cause the processor to identify discriminative features of a part of a sample complex-image, the discriminative feature characteristic of the part of the complex-object.

20. The non-transitory, computer-readable storage medium of claim 15, wherein the program code is further configured to cause the processor to designate a searched pixel patch to be disregarded when selecting future pixel patches, the searched pixel patch found to be to be devoid the discriminative features characterizing a feature of a part of the complex-object.

* * * * *